Nov. 4, 1952        C. W. PLOEN        2,616,209
SHIELD FOR FISHHOOKS
Filed May 26, 1948
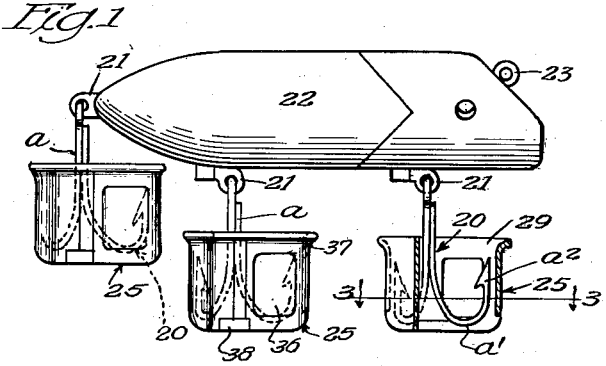
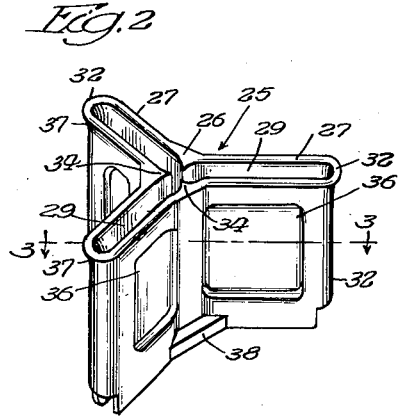
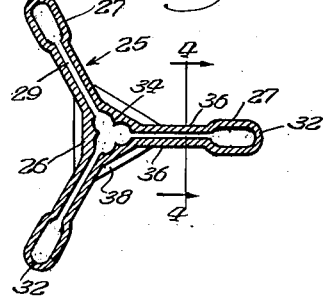
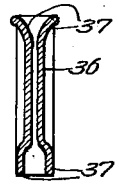
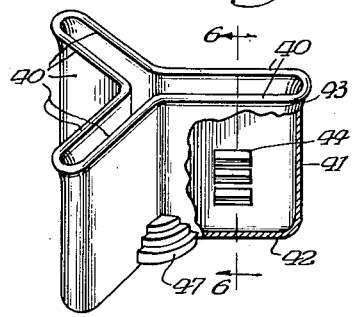
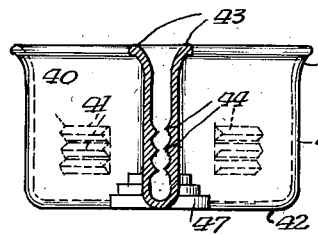
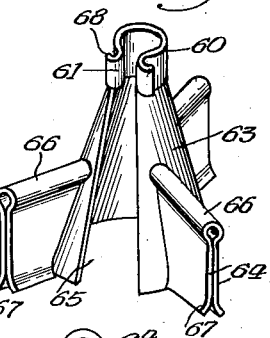
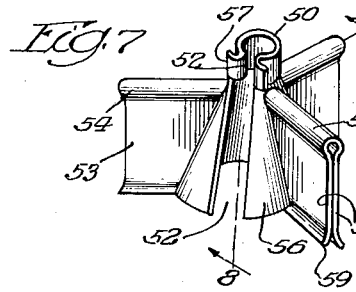
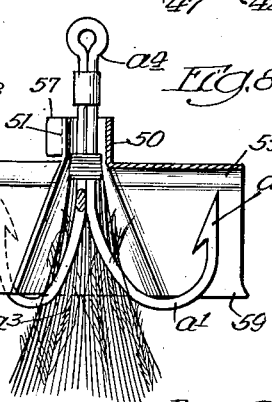
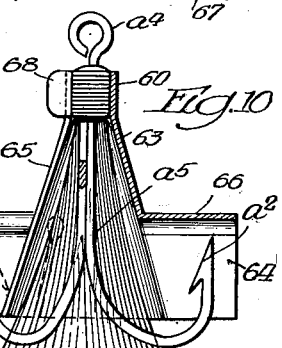
Inventor
Curtis W. Ploen
By Fred Gerlach his Atty Patented Nov. 4, 1952

2,616,209

UNITED STATES PATENT OFFICE 2,616,209

SHIELD FOR FISHHOOKS

Curtis W. Ploen, Chicago, Ill.

Application May 26, 1948, Serial No. 29,341

2 Claims. (Cl. 43—54.5)

The invention relates to shields or guards for gangs of fish-hooks.

In carrying fishing tackle which includes lures with gang hooks, or in storing them in a tackle-box, the points or barbs on the hooks are frequently caught on extraneous objects, and a desideratum is to provide an effective, simple and efficient shield for each hook of a gang, which can be readily applied to the hooks when the lure is not being used in fishing, to prevent the hooks from catching on objects or on other tackle in a tackle-box.

One object of the invention is to provide a shield for hooks of a gang which provides a protective individual cover for the hooks, and which can be easily attached to the hooks when they are not in use, and can be easily and conveniently detached therefrom when the hooks are to be used.

Another object of the invention is to provide a shield for a lure which includes a gang of hooks, and which is simple in construction and will efficiently prevent the points of the hooks from being caught on extraneous objects.

Other objects of the invention will appear from the detailed description.

The invention consists in the several novel features hereinafter set forth and more particularly defined by claims at the conclusion hereof.

In the drawings—

Fig. 1 is a side elevation of an artificial lure with the shields on the several gangs of hooks on the lure;

Fig. 2 is a perspective of one of the shields;

Fig. 3 is a horizontal section, taken on line 3—3 of Fig. 1;

Fig. 4 is a section taken on line 4—4 of Fig. 3;

Fig. 5 is a perspective, one of the walls being broken away for illustrative purposes, of another form of the invention;

Fig. 6 is a section taken on line 6—6 of Fig. 5;

Fig. 7 is a perspective of another form of the invention;

Fig. 8 is a vertical section taken, on line 8—8 of Fig. 7, of the shield illustrated in Fig. 7, with a gang of hooks shown therein;

Fig. 9 is a perspective of another modified form of the invention; and

Fig. 10 is a vertical section of the shield shown in Fig. 9, a gang of hooks with a bucktail being shown therein.

In Fig. 1 shields are illustrated as individually applied to a series of three-hook gangs 20 which are suspended from eyes 21 on a body 22 of an artificial lure, which is provided with an eye 23 to which a fish-line may be attached. The guard, as exemplified in Figs. 1 to 4, includes a body generally designated 25, which is provided with three pockets or cells for individually holding and protecting a gang of three hooks having their shanks $a$ joined together and each including the usual loop $a'$ and point $a^2$.

This body comprises a central portion 26 and three pairs of side-walls 27 extending radially outward from said central portion, and having their outer ends closed by a curved end-wall 32 to form three pockets or sockets 29 for the hooks of the gang. Each pocket is adapted to receive one hook of the gang, and has its upper end open for the endwise insertion and removal of the hooks. The space in central portion 26 communicates with the inner ends of pockets 29 and is adapted to receive the three joined shanks $a$ with the hooks extending into the pockets. Longitudinal ribs 34 formed in the central portion 26 fit around the soldered portion of the shanks $a$ of the hooks. The side-walls 27 of each socket of each pair are spaced apart sufficiently to receive one hook of the gang, and are provided with indented portions 36 for resiliently engaging a hook. The body 25 is preferably formed of suitable plastic or metal to render the side-walls sufficiently resilient for removably securing the shield in its protective position around the hooks. The upper and lower ends of walls 27 are flared as at 37 to facilitate the insertion and removal of the hooks. The indented portions 36 may grip portions of the loops $a'$ of the hooks or yieldingly hold them against withdrawal. Adjacent its lower end, the body 25 is provided with outside ribs or ledges 38 which extend between adjacent side walls 27 to form a convenient grip whereby the shield may be manipulated onto and removed from the gang of hooks. For lightness in weight, the lower ends of the pockets are left open in this form of shield.

In using the shield, the loops $a'$ of the hooks of the gang are inserted between the flared upper ends of pockets 29 and shifted endwise into the pockets 29 until the loops and points $a^2$ are confined between walls 27. The resilient indented portions 36 will grip portions of loops $a'$ and hold them in the pockets to detachably secure the shield on the gang of hooks. The ribs 34 will also engage the portions of the shanks $a$ of the hooks which are usually soldered together. When the hooks are confined in the pockets 29, the points $a^2$ of the hooks will be protected by side-walls 27 against contact with extraneous objects, and the shield will be detachably held on the gang against accidental displacement. To remove the shield from the hooks, the user will grasp ledges 38 and pull the shield off the hooks and out of pockets 29. During such withdrawal the hooks will pass between indented portions 36 of the shield. This construction exemplifies a readily detachable shield, with pockets for individually protecting the points of the hooks of a gang, which is adapted to receive the hooks endwise, and by which accidental detachment of the shield from the hooks will be prevented. The shield may be formed of integral parts, is light in weight, and can be easily and quickly placed on and removed from the gang of hooks.

In the form of the invention illustrated in Figs. 5 and 6, the body of the shield comprises three pairs of side-walls 40 having their outer ends joined by a curved wall 41 and their lower ends joined by a curved bottom wall 42. These walls form three pockets for individually holding and protecting the hooks of a gang. The pockets are open at their upper ends for the endwise insertion of the hooks of a gang. The upper portions of walls 40 are flared as at 43 to facilitate the entry of the loops $a'$ of the hooks into the pockets. The confronting faces of each pair of side-walls 40 are provided with V-shaped ribs 44 for holding the loops of the fish-hooks in the lower ends of the pockets. In placing the shield on the hooks of a gang, the loops $a'$ of the fish-hooks are inserted into the open ends of the pockets until they engage the bottom walls 42. As the loops $a'$ are forced into the pockets, the resiliency of the side-walls 40 will permit the ribs 44 to spread so that when the loops $a'$ are in their lowered position, they will be yieldingly held in the pockets by said ribs and prevent accidental withdrawal of the shield from the hooks. A series of ledges 47 on the lower end of the body between walls 40 are provided so that the shield may be gripped for manipulating it onto and off a gang of hooks.

Figs. 7 and 8 illustrate a modification in which the shield is adapted for a lure, which includes a gang of hooks and feathers $a^3$ or a bucktail attached to the shanks of the hooks near the loops $a'$. With these lures it is advantageous to adapt the shield to be applied to the hooks while the lure is connected to a fishing line. For this purpose the shield is provided with a side-opening for the sidewise insertion and removal of the shanks of the hooks, and with a conical body for receiving the feathers and pockets into which the hooks are insertable. The body of the shield includes a sleeve 50 which is provided with a side-slot 51 which communicates with slot 52, and three pairs of walls 53 which are resiliently connected at their upper ends by loops 54 and extend radially from the conical body portion 56. Each pair of walls 53 forms a pocket for individually protecting the points of the hooks, and the walls are adapted to resiliently grip portions of a hook. The lower ends of each pair of side-walls are flared as at 59 to facilitate the entry of the hooks between said walls. The sleeve 50 at slot 51 is provided with flared portions 57. In the use of this form of shield, the upper portion of the shanks of the hooks or the eye are passed sidewise through slot 52, while the loops $a'$ and points $a^2$ of the hooks are below the walls 53. The hooks of the gang are then positioned between the flared lower ends 59 of walls 53, and the hooks are then forced between said walls which will frictionally grip the hooks and protect the points $a^2$ of the hooks from contact with extraneous objects. In detaching the shield from the gang of hooks, the shield is forced upwardly until the points $a^2$ of the hooks are released by walls 53 and then moved sidewise to withdraw the shanks of the hooks through slot 52 in the body of the shield.

In Figs. 9 and 10 the shield is exemplified for a gang of hooks to which a bucktail $a^5$ is secured by wrapping, which extends around the shanks of the hook adjacent the eye $a^4$. The shield includes a sleeve 60 which is provided with a side-slot 61, an elongated conical body 63 depending from said sleeve and provided with a downwardly flared side-slot 65 communicating with slot 61, and three pairs of walls 64 which form pockets for the hooks and extend radially from the lower portion of the conical body. The upper ends of each pair of walls 64 are resiliently joined by loops 66, and the lower margins of said walls are flared as at 67. The sleeve 60 at slot 61 has flared portions 68. Slot 65 permits the eye $a^4$ and the upper portions of the shanks of the hook to pass into the conical body 63, so that the wrapping around the shanks of the hooks may be shifted endwise into the sleeve 60. In the use of this form of shield, the eye $a^4$, the wrapping on the shanks and the upper portions of the shanks and the bucktail are inserted into the conical body 63 sidewise through slot 65. The shield is then shifted into position, as illustrated in Fig. 10, so that the points $a^2$ of the hooks will be gripped by the resilient walls 64, the wrapping on the shank will be confined in sleeve 60, and the major portion of the bucktail will be confined in the conical body 63. The shield will then be secured on the hooks against accidental displacement, and the points $a^2$ of the hooks will be protected against contact with extraneous objects, and the bucktail will be confined in the conical body. In detaching the shields, the hooks are withdrawn endwise from the grip of walls 64, and then the shanks of the hooks and the eye $a^4$ are withdrawn sidewise through slot 65.

The invention exemplifies a shield or a gang of fish-hooks, which includes pockets for individually protecting the points of the hooks and preventing them from catching on extraneous objects, is simple in construction, can be economically fabricated, is light in weight, and can be easily applied to and removed from the gang of hooks.

Having thus described my invention, what I claim as new and desire to secure by Letters Patent is:

1. A shield for a gang of fish hooks having shanks joined together, comprising: an upwardly tapered conical body, a sleeve at the upper end of the body, the body and sleeve having vertically aligned and connecting slots for the side-wise insertion of the joined shanks into the body, and three pairs of side walls extending radially from the body, each pair being resiliently joined by an integral loop along their upper edges, and having separable lower edges, for the endwise insertion of the hooks, the inner confronting faces of each pair of side walls fitting together to resiliently grip a hook flatwise between them, the side walls forming pockets in which the hooks are insertible and individually and resiliently gripped.

2. A shield for a gang of fish hooks having shanks joined together, comprising: an upwardly tapered conical body, a sleeve at the upper end of the body, the body and sleeve having vertically aligned and connecting slots for the side-wise insertion of the joined shanks into the body, and three pairs of side walls extending radially from the body, each pair being resiliently joined by an integral loop along their upper edges, and having separable lower edges for the endwise insertion of the hooks, the inner faces of each pair of side walls fitting together to resiliently grip a hook flatwise between them, the lower edges of each pair of side walls being flared to direct a hook between them, the side walls forming pockets in which the hooks are insertible and individually and resiliently gripped.

CURTIS W. PLOEN.

REFERENCES CITED

The following references are of record in the file of this patent:

UNITED STATES PATENTS

| Number | Name | Date |
|---|---|---|
| 867,439 | Staehle | Oct. 1, 1907 |
| 1,255,516 | Daller | Feb. 5, 1918 |
| 2,095,048 | Aikins | Oct. 5, 1937 |
| 2,204,185 | Lougheed | June 11, 1940 |